US011575173B2

(12) United States Patent
Cornelli et al.

(10) Patent No.: US 11,575,173 B2
(45) Date of Patent: Feb. 7, 2023

(54) RECHARGEABLE ENERGY STORAGE SYSTEM WITH DIFFERENT CELL CHEMISTRIES

(71) Applicant: GM GLOBAL TECHNOLOGY OPERATIONS LLC, Detroit, MI (US)

(72) Inventors: Andrew J. Cornelli, Clawson, MI (US); Philip J. Prociw, Grosse Pointe Woods, MI (US); Karl C. Dorgan, West Bloomfield, MI (US); Andrew C. Baughman, Northville, MI (US); Steven J. Bunce, Farmington Hills, MI (US); Steven M. Davis, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 852 days.

(21) Appl. No.: 16/536,904

(22) Filed: Aug. 9, 2019

(65) Prior Publication Data
US 2021/0043894 A1 Feb. 11, 2021

(51) Int. Cl.
*H02J 7/00* (2006.01)
*H01M 50/20* (2021.01)

(52) U.S. Cl.
CPC ........... *H01M 50/20* (2021.01); *H02J 7/0021* (2013.01); *H02J 7/00041* (2020.01); *H02J 7/0078* (2013.01)

(58) Field of Classification Search
CPC .......................... H02J 7/00045; H02J 7/00047
USPC ........................................................ 429/120
See application file for complete search history.

(56) References Cited

U.S. PATENT DOCUMENTS

| 2014/0242420 A1* | 8/2014 | Schaffner | G01R 31/382 |
| | | | 429/50 |
| 2016/0181838 A1* | 6/2016 | Bryngelsson | B60L 58/13 |
| | | | 320/112 |
| 2018/0026457 A1* | 1/2018 | Delevski | H02J 7/0071 |
| | | | 320/106 |

FOREIGN PATENT DOCUMENTS

CN 107402355 A * 11/2017 ........... G01R 31/385

* cited by examiner

*Primary Examiner* — Edward Tso
*Assistant Examiner* — Ahmed H Omar
(74) *Attorney, Agent, or Firm* — Quinn IP Law (57) ABSTRACT

A rechargeable energy storage system includes a battery pack and a battery controller. The battery pack has a voltage current temperature module and multiple battery modules. Respective battery modules have multiple battery cells and are operable to store a module identifier that encodes at least one parameter of the battery cells, receive a configuration request from the voltage current temperature module, and transfer the module identifier to the voltage current temperature module in response to the configuration request. The battery controller is in communication with the voltage current temperature module and is operable to send a status request to the voltage current temperature module, receive the plurality of module identifiers from the voltage current temperature module in response to the status request, and compare the module identifiers to determine either a match or at least one mismatch among the module identifiers of the battery modules.

20 Claims, 4 Drawing Sheets

RECHARGEABLE ENERGY STORAGE SYSTEM WITH DIFFERENT CELL CHEMISTRIES

INTRODUCTION

Replacement of components in a rechargeable energy storage system may result in an improper configuration due to a visually indistinguishable nature of the components. Mixing components that are compliant with different specifications and of different ages within the rechargeable energy storage system may cause problems during operation. Old versions of the components working side-by-side with newer versions of the components may degrade overall performance to that of the components with the weakest chemistry. Adapting calibration processes to the mismatches within the rechargeable energy storage system may be difficult. What is desired is a technique to flag and/or automatically adjust to the mixed configurations.

SUMMARY

A rechargeable energy storage system is provided herein. The rechargeable energy storage system includes a battery pack and a battery controller. The battery pack has a voltage current temperature module, and a plurality of battery modules. Respective ones of the plurality of battery modules have a plurality of battery cells. The respective ones of the plurality of battery modules are operable to store a module identifier that encodes at least one parameter of the plurality of battery cells, receives a configuration request from the voltage current temperature module, and transfers the module identifier to the voltage current temperature module in response to the configuration request. The battery controller is in communication with the voltage current temperature module. The battery controller is operable to send a status request to the voltage current temperature module, receive the plurality of module identifiers from the voltage current temperature module in response to the status request, and compare the plurality of module identifiers to determine either a match or at least one mismatch among the plurality of parameters of the plurality of battery modules.

In one or more embodiments of the rechargeable energy storage system, the respective ones of the plurality of battery modules include an interconnect circuit board electrically coupled to the plurality of battery cells, and operable to store the module identifier.

In one or more embodiments of the rechargeable energy storage system, the at least one parameter indicates a cell chemistry of the plurality of battery cells in a corresponding one of the plurality of battery modules.

In one or more embodiments of the rechargeable energy storage system, the at least one parameter indicates a module configuration of the plurality of battery cells in a corresponding one of the plurality of battery modules.

In one or more embodiments of the rechargeable energy storage system, the battery controller is further operable to disable one or more of a charging and a discharging of the battery pack in response to the plurality of module identifiers indicating the at least one mismatch among the plurality of parameters of the plurality of battery modules, and set a flag that requests resolution of the at least one mismatch.

In one or more embodiments of the rechargeable energy storage system, the battery controller is further operable to automatically adjust a pack charging profile of the battery pack in response to the plurality of module identifiers indicating the at least one mismatch among the plurality of parameters of the plurality of battery modules.

In one or more embodiments of the rechargeable energy storage system, the pack charging profile is a minimum charging profile based on a slowest module charging profile of at least one of the plurality of battery modules.

In one or more embodiments of the rechargeable energy storage system, the pack charging profile is a blended pack charging profile that provides a weighted average of a plurality of module charging profiles of the plurality of battery modules.

In one or more embodiments of the rechargeable energy storage system, the battery pack and the battery controller are mountable in a vehicle.

A method for verifying installation of a battery module in a battery pack is provided herein. The method comprises storing a module identifier in the battery module, wherein the module identifier encodes at least one parameter of a plurality of battery cells in the battery module. The method includes receiving a configuration request at the battery module from a voltage current temperature module of the battery pack, transferring the module identifier from the battery module to the voltage current temperature module in response to the configuration request, and comparing the module identifier of the battery module with a plurality of additional module identifier of a plurality of additional battery modules in the battery pack to determine either a match or at least one mismatch of the module identifier of the battery module with the plurality of additional module identifiers of the plurality of additional battery modules.

In one or more embodiments, the method further comprises electrically coupling an interconnect circuit board of the battery module with the plurality of battery cells, wherein the module identifier is stored in the interconnect circuit board.

In one or more embodiments of the method, the at least one parameter indicates a cell chemistry of the plurality of battery cells in the battery module.

In one or more embodiments of the method, the at least one parameter indicates a module configuration of the plurality of battery cells in the battery module.

In one or more embodiments of the method, the module configuration is an operational life of the plurality of battery cells.

In one or more embodiments, the method further comprises disabling one or more of a charging and a discharging of the battery pack in response to the module identifier and the plurality of additional module identifiers indicating the at least one mismatch, and setting a flag that requests resolution of the at least one mismatch.

In one or more embodiments, the method further comprises automatically adjusting one or more of a pack charging profile or a pack discharging profile of the battery pack in response to the module identifier and the plurality of additional module identifiers indicating the at least one mismatch.

A battery pack is provided herein. The battery pack comprises a plurality of battery modules and a voltage current temperature module connected to the plurality of battery modules. Respective ones of the plurality of battery modules include a plurality of battery cells, and an interconnect circuit board. The interconnect board is electrically coupled to the plurality of battery cells, and in communication with the voltage current temperature module. The interconnect board is operable to store a module identifier that encodes at least one parameter of the plurality of battery cells, receive a configuration request from the voltage current temperature module, and transfer the module identifier via to the voltage current temperature module in response to the configuration request. The plurality of module identifiers of the plurality of battery modules are suitable to determine either a match or at least one mismatch among the plurality of module identifiers of the plurality of battery modules.

In one or more embodiments of the battery pack, the at least one parameter indicates a cell chemistry of the plurality of battery cells.

In one or more embodiments of the battery pack, the at least one parameter indicates a module configuration of the plurality of battery cells.

In one or more embodiments of the battery pack, the module configuration of the plurality of battery cells is an operational life of the plurality of battery cells.

The above features and advantages and other features and advantages of the present disclosure are readily apparent from the following detailed description of the best modes for carrying out the disclosure when taken in connection with the accompanying drawings.

DETAILED DESCRIPTION

Embodiments of the design generally provides a rechargeable energy storage system that has a built-in ability to determine when different cell chemistries and/or different module components have been installed. Different generations of battery packs in rechargeable energy storage systems may introduce multiple cell chemistries as part of initial launches and subsequent enhancements. The different cell chemistries generally have different performance characteristics that affect energy storage capacity, charge curves (or profiles), discharge curves (or profiles) and/or DC fast charge (DCFC) capabilities.

Various embodiments of the design generally allow for communication between the battery modules, a voltage current temperature module and a battery controller such that a virtual model of the battery pack may be created. The virtual model may be used to calculate state of charge (SOC), apply voltage/current limits, apply charging profiles and perform charge-time estimations. The virtual model may provide for better manage specification limits for a battery pack containing mixed chemistries.

A microcontroller equipped with memory may be incorporated into the circuitry of the battery modules. Component information may be actively measured by the onboard microcontroller and/or other components within the same battery module. The measured data may subsequently be used to notify a user of an incorrectly installed component and/or to automatically adjust system calibrations to maximize performance.

Figure 1:
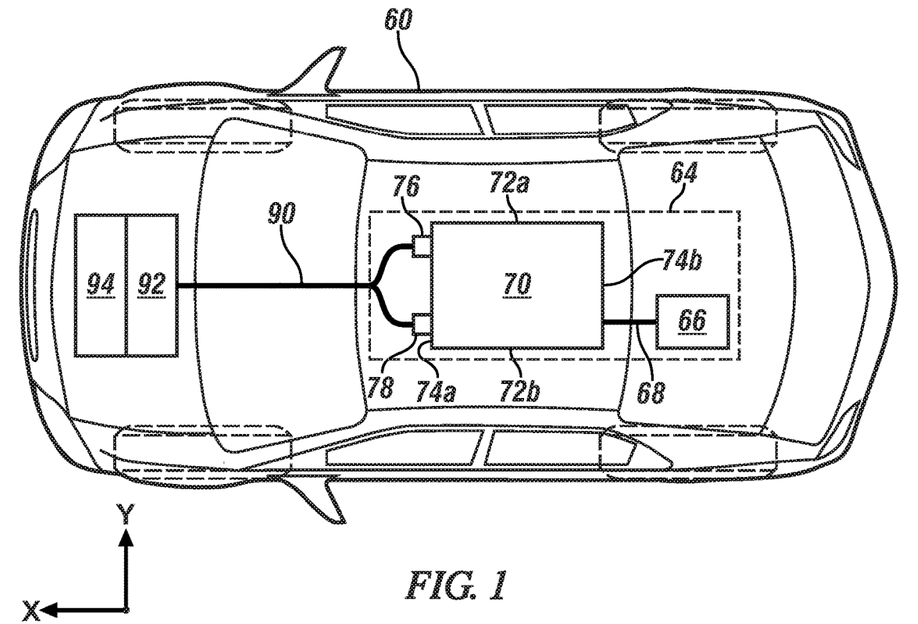
FIG. 1 is a schematic plan diagram illustrating a context of a system.

Referring to FIG. 1, a schematic plan diagram illustrating a context of a system is shown. The system may implement a vehicle 60. The vehicle 60 generally comprises a rechargeable energy storage system 64, a harness 90, a power-pack controller 92 and one or more motors 94 (one motor 94 is shown for clarity). The rechargeable energy storage system 64 may include a battery controller 66, a communication bus 68 and one or more battery packs 70 (one battery pack 70 is shown for clarity). The battery pack 70 may include opposing pack sides 72*a*-72*b*, opposing pack ends 74*a*-74*b*, a positive battery pack terminal 76 and a negative battery pack terminal 78. For the purposes of explanation, a front of the vehicle 60 may be aligned in a positive X direction. A right side of the vehicle 60 (as seen looking down at a top of the vehicle 60) may be aligned in a positive Y direction. The positive Y direction may be perpendicular to the positive X direction.

The vehicle 60 may include, but is not limited to, mobile objects such as automobiles, trucks, motorcycles, boats, trains and/or aircraft. In some embodiments, the vehicle 60 may include stationary objects such as billboards, kiosks, power back-up systems (e.g., uninterruptible power supplies) and/or marquees. Other types of vehicles 60 may be implemented to meet the design criteria of a particular application.

The rechargeable energy storage system 64 is generally operational to store energy used by the power-pack controller 92 and the motor 94. In a charging mode, the rechargeable energy storage system 64 may receive electrical current from the power-pack controller 92. In a discharging mode, the rechargeable energy storage system 64 may provide electrical current to the power-pack controller 92 to operate the motor 94.

The battery controller 66 may be implemented as a vehicle interface control module (VICM). The battery controller 66 is generally operational to control one or more profiles and/or modes of the battery pack 70. The profiles may include a pack charging profile, a fast charging profile and/or a pack discharging profile. The profiles generally establish maximum current rates, maximum voltages, minimum voltages and maximum temperatures for the battery pack 70. The profiles may be temperature dependent, mileage (e.g., odometer-measured distances) dependent and/or operational life (e.g., time) dependent.

The battery controller 66 may also be operational to determine if the battery modules 100*a*-100*n* (see FIG. 2) within the battery pack 70 are uniform or non-uniform in terms of cell chemistry and/or module configurations. The uniform/not uniform determination may be made based on module identifiers stored in the respective battery modules 100*a*-100*n* and transferred to the battery controller 66.

The battery controller 66 may be further operational to act based on the uniform/not uniform determination. In various embodiments, the battery controller 66 may prevent charging and/or discharging of the battery pack 70 while a mixture of battery module types are installed in the battery pack 70. A flag may be set by the battery controller 66 while the charging and/or discharging is disrupted to request service from a technician to correct or resolve the mismatch.

In some embodiments, the battery controller 66 may be operational to adjust a pack charging profile and/or a pack discharging profile of the battery pack 70 to account for differences among the battery modules 100*a*-100*n*. The battery controller 66 may set the pack charging profile of the battery pack 70 to accommodate a slowest (or weakest) module charging profile supported by one or more of the battery modules 100*a*-100*n*. In other situations, the battery controller 66 may set the pack charging profile to a blended pack charging profile. The blended pack charging profile may be a weighted average of the various module charging profiles based on chemistry proportions and/or module configurations.

The communication bus 68 may implement a bidirectional bus. The communication bus 68 is generally operational to transfer data between the battery controller 66 and the battery pack 70. The data may include but is not limited to a status request and the module identifiers. Other types of data may be implemented to meet the design criteria of a particular application.

The status request may be sent from the battery controller 66 to the battery pack 70. The status request generally asks for a reply of a module identifier from each battery module 100*a*-100*n*. The module identifiers may be used by the battery controller 66 to determine if the battery modules 100*a*-100*n* in the battery pack 70 are uniform (e.g., match each other) or non-uniform (e.g., do not match each other). The module identifiers may be transferred from the battery pack 70 to the battery controller 66 in response to the status request.

The battery pack 70 (or each of the battery packs 70) may be a high-voltage battery pack configured to store electrical energy. The battery pack 70 is generally operational to receive electrical power from the power-pack controller 92 and provide electrical power to the power-pack controller 92. The battery pack 70 may include multiple battery modules electrically connected in series and/or in parallel between the positive battery pack terminal 76 and the negative battery pack terminal 78. In various embodiments, the battery pack 70 may provide approximately 200 to 1,000 volts DC (direct current) electrical potential between the positive battery pack terminal 76 and the negative battery pack terminal 78. Other battery voltages may be implemented to meet the design criteria of a particular application. The pack sides 72*a*-72*b* may face the positive Y direction and the negative Y direction. The pack ends 74*a*-74*b* may face the positive X direction and the negative X direction. The positive battery pack terminal 76 and the negative battery pack terminal 78 may be physically and electrically connected to the harness 90.

The harness 90 may be an electrical harness. The harness 90 is generally operational to carry electrical power between the power-pack controller 92 and the battery pack 70. In the charging mode, the harness 90 may transfer the electrical power from the power-pack controller 92 to the battery pack 70. In the discharging mode, the electrical power may flow along the harness 90 from the battery pack 70 to the power-pack controller 92.

The power-pack controller 92 may be implemented as a controller that exchanges electrical power between the battery pack 70 and the motor 94. The power-pack controller 92 is generally operational to transfer electrical power from an alternator to the battery pack 70 in the charging mode to charge the battery pack 70. The power-pack controller 92 may draw electrical power from the battery pack 70 in the discharge mode. The electrical power received from the battery pack 70 may be used to power the motor 94 and/or other loads within the vehicle 60.

The motor 94 (or each of the motors 94) may be an electric motor. The motor 94 is generally operational to provide rotation and torque to drive wheels of the vehicle 60. The electrical power consumed by the motor 94 may be provided by the battery pack 70 and/or the alternator of the vehicle 60 under the control of the power-pack controller 92.

Figure 2:
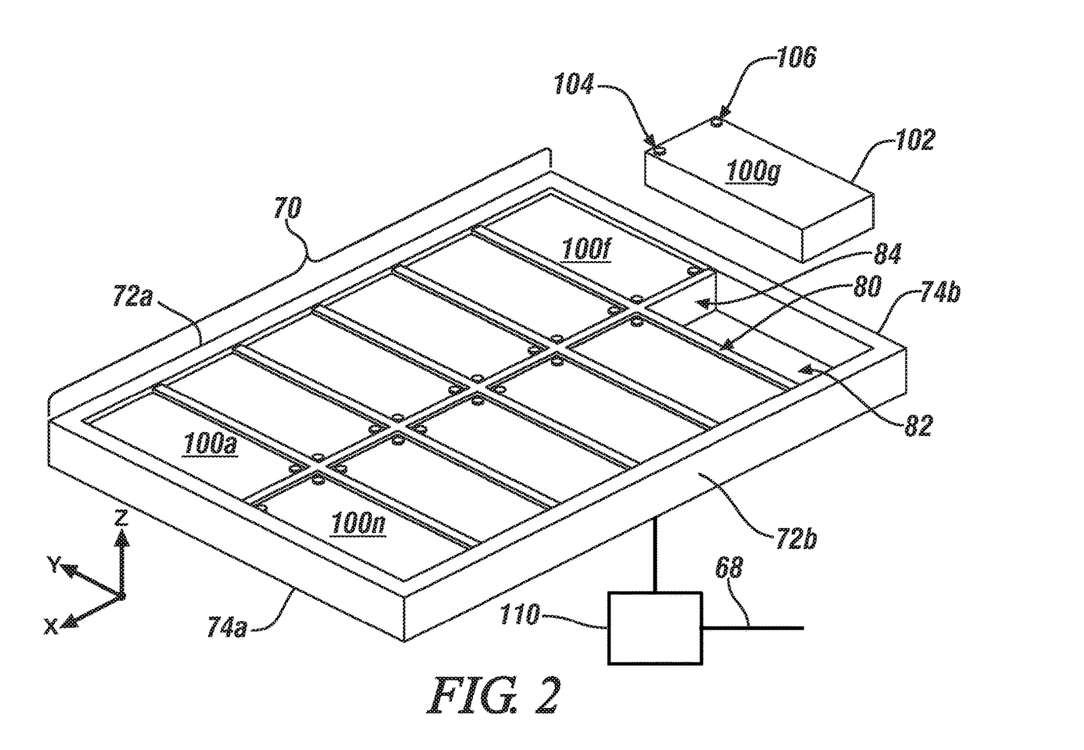
FIG. 2 is a schematic partial exploded perspective diagram of a battery pack in accordance with an exemplary embodiment.

Referring to FIG. 2, a schematic partial exploded perspective diagram of an example implementation of the battery pack 70 is shown in accordance with an exemplary embodiment. The battery pack 70 generally comprises the pack sides 72*a*-72*b*, the pack ends 74*a*-74*b*, the positive battery pack terminal 76 (see FIG. 1), the negative battery pack terminal 78 (see FIG. 1), an optional cross-car beam 80, a pack floor 82, an optional fore/aft spine 84, multiple battery modules 100*a*-100*n* and a voltage current temperature module (VITM) 110. Each battery module 100*a*-100*n* generally comprises a housing 102, a positive battery module terminal 104 and a negative battery module terminal 106. In various embodiments, the battery module terminals 104-106 may be mounted on the housing 102 near one of the battery module ends. In other embodiments, the battery module terminals 104-106 may be mounted on other components within the battery modules 100*a*-100*n* (e.g., on interconnect circuit boards) and exposed through opening(s) in the housing 102.

The battery module 100*a*-100*n* may be connected in series between the positive battery pack terminal 76 and the negative battery pack terminal 78. A height of the battery pack 70 may be aligned in a positive Z direction. The positive Z direction may be normal to a plane defined by the X direction and the Y direction.

The voltage current temperature module 110 may be an internal controller for the battery pack 70. The voltage current temperature module 110 is generally operational to adjust operations of the battery pack 70 in response to the voltage across the battery pack 70, the current sent from and received by the battery pack 70 and a temperature of the battery pack 70. The voltage current temperature module 110 may sense a temperature of the battery pack 70 using a thermistor or a thermocouple in either an interconnect circuit board or as a component on a wiring harness mounted to the battery pack 70. The voltage current temperature module 110 may be connected to the battery controller 66 through the communication bus 68.

Figure 3:
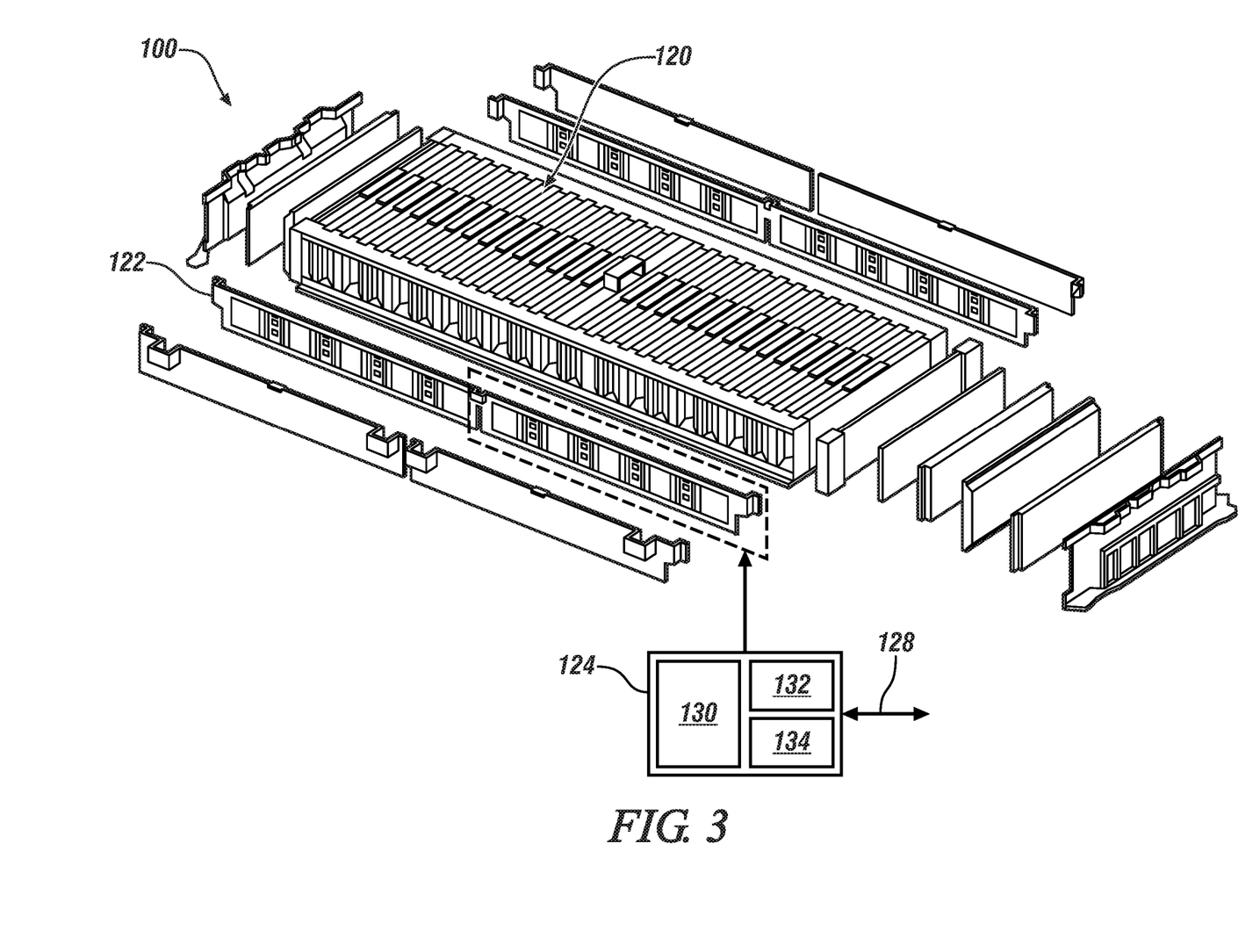
FIG. 3 is a schematic partial exploded perspective diagram of a battery module in accordance with an exemplary embodiment.

Referring to FIG. 3, a schematic partial exploded perspective diagram of a battery module 100 is shown in accordance with an exemplary embodiment. The battery module 100 may be representative of the individual battery modules 100*a*-100*n*. The battery module 100 generally comprises multiple battery cells 120, an interconnect circuit board 122, a control circuit 124 and a local bus 128. The control circuit 124 may be mounted on the interconnect circuit board 122. The control circuit 124 generally comprises a microcontroller 130, a random-access memory (RAM) 132 and a read-only memory (ROM) 134.

The battery cells 120 may be electrical cells configured to store electrical energy. The battery cells 120 are generally operational to receive electrical power while in the charging mode and provide electrical power while in the discharge mode. In some embodiments, the battery cells 120 may be configured as 3.5 volt to 4.2 volt DC cells. Other battery cell voltages may be implemented to meet design criteria of a particular application.

The interconnect circuit board 122 may be a multi-layer circuit board. The interconnect circuit board 122 is generally operational to provided electrical paths for electrical power and electrical signals between the battery cells 120, and the control circuit 124.

The control circuit 124 may be implemented as a controller. The control circuit 124 may include a built-in memory (132 and 134). The control circuit 124 may also have an interface to the local bus 128 and multiple input/output circuits. The control circuit 124 is generally operational to provide active electronics to the interconnect circuit board 122 that provides communication between battery controller 66 and the battery module 100. The control circuit 124 may store a memory identifier for the battery module 100. The module identifier generally encodes at least one parameter of the battery cells 120. The control circuit 124 may receive a configuration request from the battery controller 66 via the voltage current temperature module 110 and the local bus 128. In response to the configuration request, the control circuit 124 may send the module identifier to the battery controller 66 via the voltage current temperature module 110 and the local bus 128.

The local bus 128 is configured as a bidirectional bus. The local bus 128 is generally operational to provide data between the control circuit 124 and the voltage current temperature module 110.

The microcontroller 130 is generally operational to communicate with the voltage current temperature module 110 via the local bus 128. The microcontroller may also be operational to write and read the module identifier and other data to and from the random-access memory 132.

The random-access memory 132 may be a volatile and/or a nonvolatile memory. The random-access memory 132 is generally operational to store data consumed and produced by the microcontroller 130. By way of example, the random-access memory 132 may store module-specific information used by the microcontroller 130. In some embodiments, the random-access memory 132 may also hold the module identifier.

The read-only memory 134 may have a read-only policy, a write-once read-many policy and/or a nonvolatile memory policy. The read-only memory 134 is generally operational to store software (or code) executed by the microcontroller 130. The read-only memory 134 may be programmed with module-specific parameters that the vehicle 60 and/or the battery controller 66 may apply to performance-related logic/processes. For example, the read-only memory 134 may contain data/programs for state of charge (SOC) calculations, cell balancing calculations, charge limits and/or discharge limits. In various embodiments, the read-only memory 134 may also hold the module identifier.

The memory identifiers in the battery modules 100a-100n generally enable detectability of similar/dissimilar components by the voltage current temperature module 110 within the battery pack 70 or the battery controller 66. The ability of the electronic circuitry to detect dissimilar battery modules 100a-100n may save costs in relation to keying and/or other component design changes (e.g., validation costs and reduced complexity by enabling the reuse of more part numbers).

In various embodiments, the module identifier may be implemented as a multi-byte (e.g., 4 byte) word. One of the bytes may provide up to 256 identification values to distinguish among different chemistries used in the battery cells 120. The other bytes may be used to convey other data such as manufacturer identification, block codes, service dates, time in operation, and/or odometer-measured distances. The data stored in the memory and transferred in the module identifiers generally allows the battery controller 66 to optimize performance of the battery pack 70 with respect to the available hardware (e.g., the battery modules 100a-100n) inside the battery pack 70. In addition, the stored data may enable poka-yoke repair procedures (e.g., help a service technician to avoid mistakes) by enabling a diagnostic code to set, notifying the service technician of the error.

The module identifier may be assigned to each interconnect circuit board 122 and/or battery module 100. In various embodiments, the module identifier may be collected by the voltage current temperature module 110 and reported to the battery controller 66. The different cell chemistries and/or module configurations may be decoded in the voltage current temperature module 110 and/or the battery controller 66 from the module identifier stored in the control circuit 124.

By way of example, the battery pack 70 may include multiple (e.g., five) battery modules 100a-100n. Referring to Table I, example module identifiers in the battery pack 70 are provided.

TABLE I

| Battery Module | Section A | Section B | Section C | Section D | Section E |
|---|---|---|---|---|---|
| Chemistry | A | A | B | A | A |
| Module Identifier | 1000 | 1000 | 1011 | 1000 | 1000 |

In the example of Table I, the battery modules 100a-100n in sections A, B, D and E may have a similar battery cell chemistry and/or a similar module configuration. Therefore, battery modules 100a-100n in sections A, B, D and E may have the same module identifier (e.g., value=1000 decimal). The battery module 100a-100n in section C may have a different battery cell chemistry and/or a different module configuration as the other battery modules 100a-100n in sections A, B, D and E. Hence, the battery module 100a-100n in section C may have a different module identifier (e.g., value=1011 decimal). In some scenarios, the mixture of module identifiers (e.g., 1000 and 1011) may be used to notify the service technician that there is a mismatched battery module 100a-100c in section C. In other scenarios, the mixture of module identifiers may be used to automatically adjust the control software in the battery controller 66 to account for the different types of battery modules 100a-100n installed in the battery pack 70.

Figure 4:
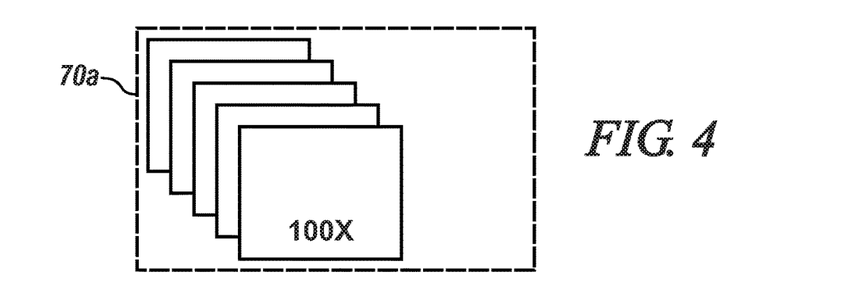
FIG. 4 is a schematic diagram of a first battery pack in accordance with an exemplary embodiment.

Referring to FIG. 4, a schematic diagram of an example first battery pack 70a is shown in accordance with an exemplary embodiment. The first battery pack 70a may use a single type of battery module 100a-100n (e.g., a first battery module 100x) in the positions (e.g., five positions). As such, the cell chemistries, age and/or module configurations of the multiple first battery modules 100x may be the same, so the module identifiers may be the same. Therefore, the multiple first battery modules 100x may have common DC fast charge (DCFC) module profiles and temperature/current/power performance criterion.

Figure 5:
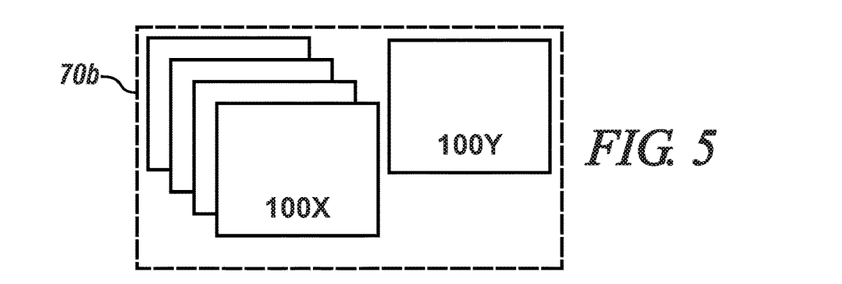
FIG. 5 is a schematic diagram of a second battery pack in accordance with an exemplary embodiment.

Referring to FIG. 5, a schematic diagram of an example second battery pack 70b is shown in accordance with an exemplary embodiment. The second battery pack 70b may include multiple (e.g., four) first battery modules 100x and a single second battery module 100y. The first battery modules 100x and the second battery module 100y may represent cell modules with different cell chemistries and/or different ages, each with unique module charging profiles and/or temperature/current/power performance criterion. As such, the module identifier of the second battery module 100y may be different than that module identifiers of the first battery modules 100x.

In an example service scenario of the second battery pack 70b, the second battery module 100y may be installed in place of an original first battery module 100x. The presence of the second battery module 100y may be unexpected but may be detected by the voltage current temperature module 110 or the battery controller 66. Upon detection, the voltage current temperature module 110 or the battery controller 66 may raise a diagnostic trouble code (DCT) flag due to the mismatched second battery module 100y within the second battery pack 70b.

Figure 6:
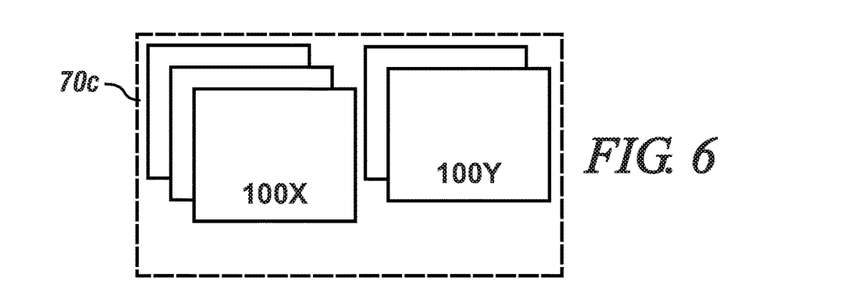
FIG. 6 is a schematic diagram of a third battery pack in accordance with an exemplary embodiment.

Referring to FIG. 6, a schematic diagram of an example third battery pack 70c is shown in accordance with an exemplary embodiment. The third battery pack 70c may include multiple (e.g., three) first battery modules 100x and multiple (e.g., two) second battery modules 100y.

In an example service scenario of the third battery pack 70c, the two second battery modules 100y may be installed into the third battery pack 70c in place of two original first battery modules 100x. The module identifiers may detect the configuration of the third battery pack 70c as three first battery modules 100x and two second battery modules 100y. If the detected configuration is acceptable, a performance profile for the third battery pack 70c may be calculate and stored in the battery controller 66 or the voltage current temperature module 110. The calculated profile may be managed by either from within the third battery pack 70c or by other electronics in the vehicle 60 to ensure proper pack operates within acceptable limits. The calculated profile generally ensures changes in performance of the third battery pack 70c resulting from the utilization of a combination of first battery modules 100x and second battery modules 100y. The changes in performance may allow proper operations inside the third battery pack 70c (e.g., not exceeding performance limitation of the various cell chemistries). While three example combinations of the first battery modules 100x and the second battery modules 100y have been described, other combinations with different numbers of additional types of battery modules 100a-100n may be implemented to meet the design criteria of a particular application.

Figure 7:
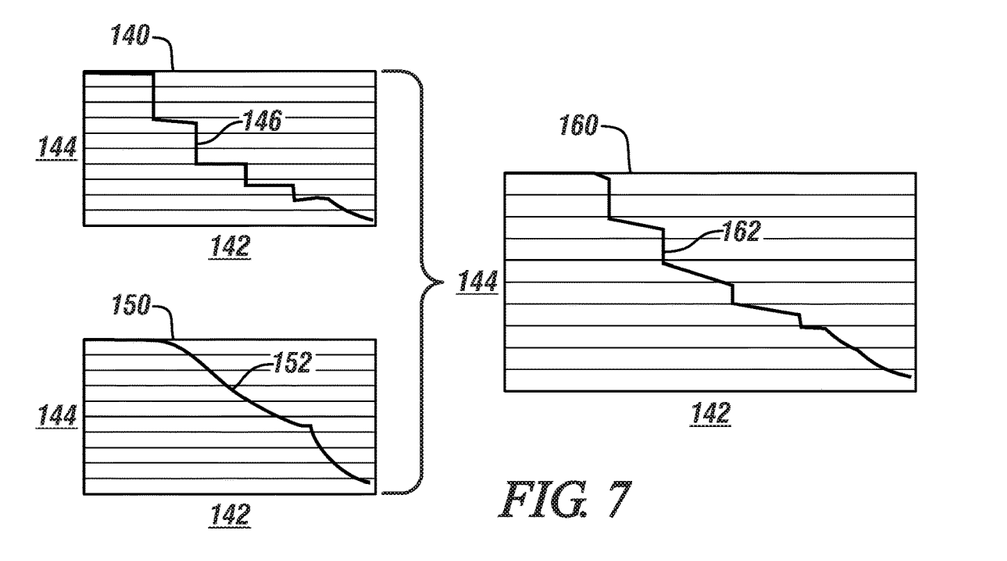
FIG. 7 is multiple graphs of a blending of different module charging profiles in accordance with an exemplary embodiment.

Referring to FIG. 7, graphs of an example blending of different module charging profiles is shown in accordance with an exemplary embodiment. Graphs 140 and 150 may illustrate various module charging profiles. Graph 160 may illustrate a pack charging profile. A time axis 142 in the graphs 140, 150 and 160 may convey time in units of second. A current axis 144 in the graphs 140, 150 and 160 may convey current in units of amperes.

The graph 140 may illustrate a first module charging profile 146 of the first battery module 100x. The first module charging profile 146 may start at a maximum current level with subsequent step reductions to lower current levels as time increases.

The graph 150 may illustrate a second module charging profile 152 of the second battery module 100y. The second module charging profile 152 may start at the maximum current level and gradually decrease to lower current levels as time increases.

The graph 160 may illustrate a blended pack charging profile 162 of a battery pack 70 having several (e.g., three) first battery modules 100x and several (e.g., two) second battery modules 100y. The blended pack charging profile 162 may be a weighted average between the first module charging profile 146 and the second module charging profile 152 based on chemistry proportions. The blended pack charging profile 162 may start at the maximum charging current and subsequently reduce based on the steps of the first module charging profile 146 and the gradual slope of the second module charging profile 152.

Figure 8:
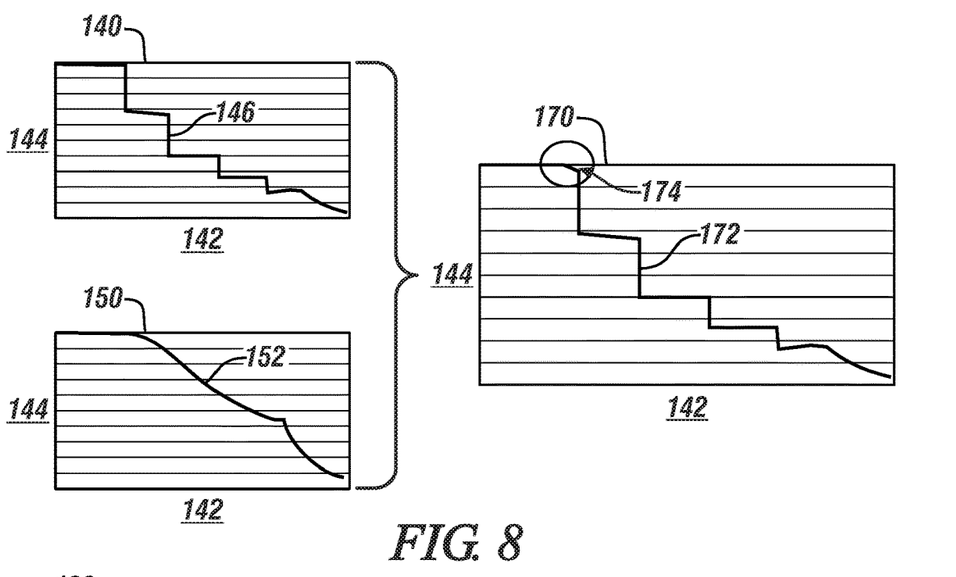
FIG. 8 is multiple graphs of a combination of the different module charging profiles in accordance with an exemplary embodiment.

Referring to FIG. 8, graphs of an example combination of different module charging profiles is shown in accordance with an exemplary embodiment. Graphs 140 and 150 may illustrate the various module charging profiles. Graph 170 may illustrate a pack charging profile. The time axis 142 in the graphs 140, 150 and 170 may convey time in units of second. The current axis 144 in the graphs 140, 150 and 170 may convey current in units of amperes.

The graph 170 may illustrate a minimum pack charging profile 172 using a "minimum" calibration for DC fast charging of a battery pack 70 having several (e.g., two) first battery modules 100x and several (e.g., three) second battery modules 100y. The minimum pack charging profile 172 may be based on a lowest module charging current of the first module charging profile 146 and the second module charging profile 152 over successive time periods. A minor clipping 174 may occur in the minimum pack charging profile 172 due to differences in the calibration of the first battery modules 100x and the second battery modules 100y. The minimum pack charging profile 172 generally tailors the calibration to recognize minimum current limits between cell chemistries so that operation of the battery pack 70 remains acceptable.

Figures 9, 10, 11:
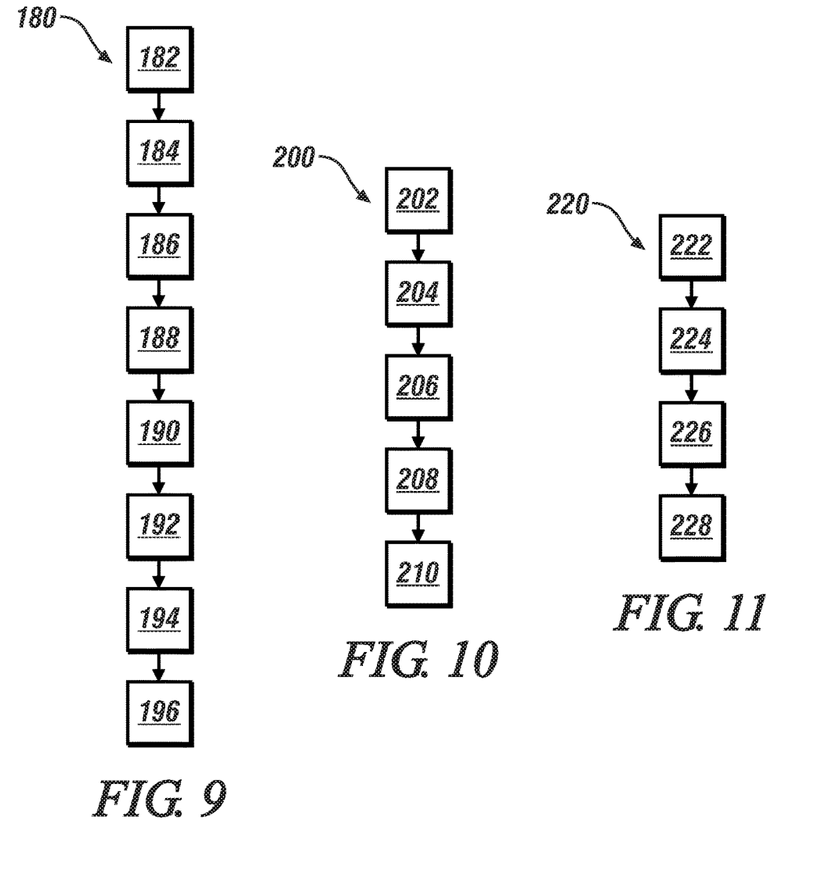
FIG. 9 is a flow diagram of a method for fabricating a rechargeable energy storage system in accordance with an exemplary embodiment.
FIG. 10 is a flow diagram for a method for authorized servicing of the battery pack in accordance with an exemplary embodiment.
FIG. 11 is a flow diagram of a method for owner servicing of the battery pack in accordance with an exemplary embodiment.

Referring to FIG. 9, a flow diagram of an example method 180 for fabricating a rechargeable energy storage system is shown in accordance with an exemplary embodiment. The method (or process) 180 may be performed using standard equipment. The method 180 generally comprises a step 182, a step 184, a step 186, a step 188, a step 190, a step 192, a step 194, and a step 196. The sequence of steps 182 to 196 is shown as a representative example. Other step orders may be implemented to meet the criteria of a particular application.

The battery pack 70 generally incorporate the microcontrollers 130 and the memory 132/134 into the circuitry of the battery modules 100a-100n. The microcontrollers 130 may communicate with onboard electronics and provide component specifications to differentiate from other components within the same battery pack 70. The data may subsequently be used to notify a user of an incorrectly installed battery module or another component. The data may also be utilized to automatically adjust the systems calibrations for optimal performance while addressing other concerns.

In step 182, the control circuits 124 may be programmed with memory identifiers, optional module configuration information and other optional data about the battery modules 100a-100n. Once programmed, the control circuits 124 may be installed into interconnect circuit boards 122 in step 184. The interconnect circuit boards 122 may then be installed in the battery modules 100a-100n having matched the cell chemistries, module configuration information and other data in step 186. Matching the interconnect circuit boards 122 with the battery cells 120 and other components in the battery modules 100a-100n may be achieved using bar codes and/or similar mechanisms.

In step 188, the battery modules 100a-100n may be installed in the battery pack 70. An end-of-line (EOL) check may be performed in step 190 at a battery assembly plant (BAP) to verify that the parameters encoded in the module identifiers match the parameters of the cell chemistries and module configurations. The end-of-line check may also verify that the various parameters of the battery modules 100a-100n installed in the battery pack 70 are the same, or within acceptable tolerances.

In step 192, the battery pack 70 and the battery controller 66 may be installed in a vehicle 60. Operation of the rechargeable energy storage system with the motor 94 and power-pack controller 92 may be tested in the step 194. Diagnostic checks may be performed in step 196 for failed tests and the failures may be corrected.

Referring to FIG. 10, a flow diagram for an example method 200 for authorized servicing of the battery pack 70 is shown in accordance with an exemplary embodiment. The method (or process) 200 may be implemented with standard equipment. The method 200 generally comprises a step 202, a step 204, a step 206, a step 208, and a step 210. The sequence of steps 202 to 210 is shown as a representative example. Other step orders may be implemented to meet the criteria of a particular application.

In the step 202, a check for service procedures, compatible cell chemistries and the like for the battery pack 70 may be performed by an authorized service technician. Specified service procedures may be performed in step 204. The vehicle 60 and the battery pack 70 may be powered in step 206. Diagnostic trouble codes that identify module identifier mismatches for battery modules 100a-100n in the battery pack 70 may be set by the battery controller 66 in step 208. In step 210, the diagnostic trouble codes may be cleared by replacing mismatched battery modules 100a-100n, flashing new software into the battery controller 66 and/or automatically updating the software in the battery controller 66 to account for the different types of battery modules 100a-100n within the battery pack 70.

Referring to FIG. 11, a flow diagram of an example method 220 for owner servicing of the battery pack 70 is shown in accordance with an exemplary embodiment. The method (or process) 220 may be implemented with standard equipment. The method 220 generally comprises a step 222, a step 224, a step 226, and a step 228. The sequence of steps 222 to 228 is shown as a representative example. Other step orders may be implemented to meet the criteria of a particular application.

In step 222 an owner of the vehicle 60 may use various tools to gain access to the battery pack 70 and perform repairs (e.g., replace one or more battery modules 100a-100n). The vehicle 60 and the battery pack 70 may be powered in step 224. Diagnostic trouble codes that identify module identifier mismatches among the battery modules 100a-100n in the battery pack 70 may be set by the battery controller 66 in step 226. The owner may use a digital multi-meter and/or a code reader to determine which diagnostic trouble codes have been set. In the absence of built-in automatic calibration reconfiguration, the battery controller 66 may disable the power pack 70 in step 228 to prevent damage to the battery pack 70 due to the mismatches. Disabling the battery pack 70 may render inoperable the vehicle functions that rely on the high-voltage power provided by the battery pack 70.

Embodiments of the design may provide limits on charging currents and discharging currents to prevent damage to the battery pack 70 (e.g., lithium plating and other effects of DC fast charging). Better fuel gauging for the battery pack 70 may be achieved by calculating an affective capacity of the battery pack 70 with a variety of configurations of the battery modules 100a-100n. The additional data stored in the control circuit 124 may enable traceability of the battery modules 100a-100n from manufacturing to final disposal. Furthermore, the control circuit 124 may be operational to measure throughput of cell module assemblies (CMA) to improve offsetting of the charging current.

While the best modes for carrying out the disclosure have been described in detail, those familiar with the art to which this disclosure relates will recognize various alternative designs and embodiments for practicing the disclosure within the scope of the appended claims.

What is claimed is:

1. A rechargeable energy storage system comprising:
a battery pack having a voltage current temperature module, and a plurality of battery modules, wherein the voltage current temperature module is physically disposed inside the battery pack and external to the plurality of battery modules, respective ones of the plurality of battery modules have a plurality of battery cells, and each of the respective ones of the plurality of battery modules is operable to:
store a module identifier that encodes at least one parameter of the plurality of battery cells;
receive a configuration request from the voltage current temperature module; and
transfer the module identifier to the voltage current temperature module in response to the configuration request; and
a battery controller in communication with the voltage current temperature module, and operable to:
send a status request to the voltage current temperature module;
receive the plurality of module identifiers from the voltage current temperature module in response to the status request; and
compare the plurality of module identifiers to determine either a match or at least one mismatch among the plurality of parameters of the plurality of battery modules, wherein the battery controller is physically external to the battery pack.

2. The rechargeable energy storage system according to claim 1, wherein the respective ones of the plurality of battery modules include an interconnect circuit board electrically coupled to the plurality of battery cells, and operable to store the module identifier.

3. The rechargeable energy storage system according to claim 1, wherein the at least one parameter indicates a cell chemistry of the plurality of battery cells in a corresponding one of the plurality of battery modules.

4. The rechargeable energy storage system according to claim 1, wherein the at least one parameter indicates a module configuration of the plurality of battery cells in a corresponding one of the plurality of battery modules.

5. The rechargeable energy storage system according to claim 1, wherein the battery controller is further operable to:
disable one or more of a charging and a discharging of the battery pack in response to the plurality of module identifiers indicating the at least one mismatch among the plurality of parameters of the plurality of battery modules; and set a flag that requests resolution of the at least one mismatch.

6. The rechargeable energy storage system according to claim 1, wherein the battery controller is further operable to automatically adjust a pack charging profile of the battery pack in response to the plurality of module identifiers indicating the at least one mismatch among the plurality of parameters of the plurality of battery modules.

7. The rechargeable energy storage system according to claim 6, wherein the pack charging profile is a minimum charging profile based on a slowest module charging profile of at least one of the plurality of battery modules.

8. The rechargeable energy storage system according to claim 6, wherein the pack charging profile is a blended pack charging profile that provides a weighted average of a plurality of module charging profiles of the plurality of battery modules.

9. The rechargeable energy storage system according to claim 1, wherein the battery pack and the battery controller are mountable in a vehicle.

10. A method for verifying installation of a battery module in a battery pack, the method comprising:
    storing a module identifier in the battery module, wherein the module identifier encodes at least one parameter of a plurality of battery cells in the battery module;
    receiving a configuration request at the battery module from a voltage current temperature module of the battery pack, wherein the voltage current temperature module is physically disposed inside the battery pack and external to the battery module;
    transferring the module identifier from the battery module to the voltage current temperature module in response to the configuration request;
    receiving a status request at the voltage current temperature module from a battery controller, wherein the battery controller is physically external to the battery pack;
    transferring the module identifier from the voltage current temperature module to the battery controller in response to the status request; and
    comparing in the battery controller the module identifier of the battery module with a plurality of additional module identifiers of a plurality of additional battery modules in the battery pack to determine either a match or at least one mismatch of the module identifier of the battery module with the plurality of additional module identifiers of the plurality of additional battery modules.

11. The method according to claim 10, further comprising:
    electrically coupling an interconnect circuit board of the battery module with the plurality of battery cells, wherein the module identifier is stored in the interconnect circuit board.

12. The method according to claim 10, wherein the at least one parameter indicates a cell chemistry of the plurality of battery cells in the battery module.

13. The method according to claim 10, wherein the at least one parameter indicates a module configuration of the plurality of battery cells in the battery module.

14. The method according to claim 13, wherein the module configuration is an operational life of the plurality of battery cells.

15. The method according to claim 10, further comprising:
    disabling one or more of a charging and a discharging of the battery pack in response to the module identifier and the plurality of additional module identifiers indicating the at least one mismatch; and
    setting a flag that requests resolution of the at least one mismatch.

16. The method according to claim 10, further comprising:
    automatically adjusting one or more of a pack charging profile and a pack discharging profile of the battery pack in response to the module identifier and the plurality of additional module identifiers indicating the at least one mismatch.

17. A battery pack comprising:
    a plurality of battery modules; and
    a voltage current temperature module connected to the plurality of battery modules, wherein the voltage current temperature module is physically disposed inside the battery pack and external to the plurality of battery modules, and respective ones of the plurality of battery modules include:
        a plurality of battery cells; and
        an interconnect circuit board electrically coupled to the plurality of battery cells, in communication with the voltage current temperature module, and each of the respective ones of the plurality of battery modules is operable to:
            store a module identifier that encodes at least one parameter of the plurality of battery cells;
            receive a configuration request from the voltage current temperature module; and
            transfer the module identifier via to the voltage current temperature module in response to the configuration request, wherein the plurality of module identifiers of the plurality of battery modules are suitable to determine either a match or at least one mismatch among the plurality of module identifiers of the plurality of battery modules.

18. The battery pack according to claim 17, wherein the at least one parameter indicates a cell chemistry of the plurality of battery cells.

19. The battery pack according to claim 17, wherein the at least one parameter indicates a module configuration of the plurality of battery cells.

20. The battery pack according to claim 19, wherein the module configuration of the plurality of battery cells is an operational life of the plurality of battery cells.

\* \* \* \* \*